United States Patent [19]

Alberts et al.

[11] 4,336,358

[45] Jun. 22, 1982

[54] ORGANOPOLYSILOXANE-URETHANE-VINYL GRAFT COPOLYMERS

[75] Inventors: Heinrich Alberts; Hans Friemann, both of Cologne; Hans Sattlegger, Odenthal; Hans-Heinrich Moretto, Cologne, all of Fed. Rep. of Germany

[73] Assignee: Bayer Aktiengesellschaft, Leverkusen, Fed. Rep. of Germany

[21] Appl. No.: 207,093

[22] Filed: Nov. 14, 1980

[30] Foreign Application Priority Data

Nov. 28, 1979 [DE] Fed. Rep. of Germany ....... 2947966

[51] Int. Cl.$^3$ .................... C08F 283/12; C08F 283/02
[52] U.S. Cl. ...................................... 525/439; 525/28; 525/404; 525/440; 525/444; 525/446; 525/477
[58] Field of Search ................. 525/28, 440, 477, 439

[56] References Cited

U.S. PATENT DOCUMENTS

| 3,008,917 | 11/1961 | Park et al. | 525/440 |
| 3,450,791 | 6/1969 | Sekmakas et al. | 525/440 |
| 3,531,424 | 9/1970 | Swanson | 525/479 |
| 3,579,522 | 5/1971 | Bendszus et al. | 525/28 |

Primary Examiner—Wilbert J. Briggs, Sr.
Attorney, Agent, or Firm—Sprung, Horn, Kramer & Woods

[57] ABSTRACT

A graft copolymer comprising (I) as a first polymeric moiety an organopolysiloxane with OH functional groups, (II) as a second polymeric moiety a polyester-urethane and, (III) units of vinyl monomers, units of the first and second polymeric moieties being linked via vinyl polymer bridges, all these units having been polymerized in the presence of mixtures of the first and second polymeric moieties, is produced by polymerizing a suitable monomer dispersion. The product is suited for replacing all or some of the organopolysiloxane component in room temperature curable compositions containing organopolysiloxanes, silane cross-linking agents and a curing catalyst.

8 Claims, No Drawings

ORGANOPOLYSILOXANE-URETHANE-VINYL GRAFT COPOLYMERS

The invention relates to graft copolymer dispersions which can be hardened at room temperature and are stable and which contain, as the first polymer, organopolysiloxanes with OH functional groups and optionally other polydiorganosiloxanes and, as the second polymer, polyester-urethanes or polyester-urethanes and polyesters or polycarbonates and optionally polyurethanes and polyethers, as well as units of vinyl monomers and units of the first and second polymers which are linked via vinyl polymer bridges, all these units having been polymerized in the presence of mixtures of the above first polymers and second polymers, and to a process for their preparation and the use of these graft copolymer dispersions.

Polymer systems which harden at room temperature and are based on organopolysiloxanes are known; compare W. Noll, Chemie und Technologie der Silikone (Chemistry and Technology of the Silicones), Verlag Chemie GmbH., 1968, page 391 et seq. Furthermore, the preparation of modified organopolysiloxanes by various procedures is possible and known. Graft polymers of organosiloxanes and vinyl polymers are described, for example, in British patent specifications Nos. 766,528, 806,582 and 869,482 and in German Auslegeschrift 1,694,973. The use of organopolysiloxanes with an organic chain grafted on and at most 25% of aryl radicals in one-component or two-component compositions which harden at room temperature is described in German Auslegeschrift 1,694,973. It is stated that the hydroxypolysiloxanes employed according to the invention in each case contain up to at most 25% of aryl radicals. It is also stated that the organic chain grafted on is formed by polymerized units of vinyl monomers, preferably styrene and acrylate.

In addition to the organopolysiloxanes modified by grafting, systems in which an unsaturated polyester is co-condensed with a functional organopolysiloxane are also known. The resulting co-condensate is dissolved in a vinyl monomer and the system is hardened by the free radical mechanism. Hardened resins which consist of an unsaturated polyester to the extent of 25-75% by weight, a vinyl polymer to the extent of 25-75% by weight and a siloxane component to the extent of 0.5-30% by weight are claimed, for example, in British Patent Application No. 801,529. Such compositions which harden during the vinyl polymerization as a result of the crosslinking reaction with the unsaturated polyester/organosiloxane co-condensate and which form crosslinked and insoluble shaped articles are unsuitable for the preparation of organosiloxane compositions which harden at room temperature.

Aliphatic or mixed aliphatic-aromatic polyesters, polyethers or polycarbonates are important industrial starting materials, for example for polyurethanes and lacquers. Mixtures of such polyesters or polyester-urethanes and organopolysiloxanes are unstable and cannot be stored, since separation of the incompatible phases takes place shortly after mixing.

Although it would be desirable for the excellent technological properties arising from aliphatic or mixed aliphatic-aromatic polyesters or polyethers in polyurethane systems or lacquers, such as flexibility and elasticity and in some cases hardness and gloss, resistance to ageing and the like, also to be utilized for the preparation of organosiloxane elastomers, this has not yet been possible.

A serious technological disadvantage of the silicone elastomers or other silicone compositions known hitherto is furthermore that articles produced from these mixtures cannot be lacquered, or the quality of the lacquering obtained on such articles is only extremely unsatisfactory. The freshly applied lacquer usually forms a coherent covering layer only for a short time, this layer in general lifting from the silicone surface on drying or exposing larger or smaller areas of non-lacquered surface.

The object of the invention was thus to provide multi-phase systems, the phases of which are stable, of organopolysiloxanes, aliphatic and mixed aliphatic-aromatic polyester-urethanes or polyester-urethanes and polyesters or polycarbonates and optionally polyether-urethanes and polyethers.

The object of the invention was furthermore to provide silicone compositions which, if appropriate after the addition of plasticizers, such as, for example, organopolysiloxanes with methyl end groups, fillers, crosslinking agents, crosslinking catalysts and components which accelerate crosslinking, and after crosslinking at room temperature, which takes place in the manner known per se, can be lacquered without problems.

Both objects were achieved by subjecting mixtures of organopolysiloxanes, as the first polymers, polyester-urethanes or polyester-urethanes and polyesters or polycarbonates and optionally their mixtures with polyethers or polyether-urethanes, as the second polymers, and vinyl monomers to free radical polymerization, if appropriate with the addition of mono-, di- or polyisocyanates and in the presence of agents which form free radicals. Stable dispersions which consist of the first polymers, second polymers and polymerized units of one or more vinyl monomers and which are characterized in that they contain graft copolymers of the first polymers and of the second polymers employed which are crosslinked via polymerized units of the vinyl monomers employed, are obtained.

The invention thus relates to graft copolymers, characterized in that they contain, as the first polymer, organopolysiloxanes with OH functional groups and optionally other polydiorganosiloxanes and, as the second polymer, polyester-urethanes or polyester-urethanes and polyesters or polycarbonates and optionally polyether-urethanes and polyethers, and units of vinyl monomers and units of the first and second polymers which have been linked via vinyl polymer bridges, all these units having been polymerized in the presence of mixtures of the above first polymers and second polymers.

Advantageously the graft copolymers comprise about (I) 10-90% by weight of organopolysiloxanes containing terminal OH functional groups (II) 5-85% by weight of aliphatic or mixed aliphatic-aromatic polyester-urethanes or polyester-urethanes and polyesters or polycarbonates and optionally polyether-urethanes and polyethers, and (III) 5-85% by weight of polymerized units of vinyl compounds.

The invention also relates to graft copolymers wherein modified by addition of mono-, di- or polyisocyanates, and the polyester-urethanes and polyether-urethanes have OH numbers of between 0 and 20.

Advantageously (III) comprises vinyl acetate units and up to 40% by weight of the polymer may be polymerized units of alkyl (meth)acrylates with 1-8 C atoms in the alkyl component, (meth)acrylamide, N-alkyl-substituted (meth)acrylamides, malamides or (meth)acrylonitrile or mixtures thereof.

In another graft copolymer according to the invention (III) comprises by weight about (a) 5–90% of styrene, (b) 10–95% of alkyl (meth)acrylates with 1–8 C atoms in the alkyl component and (c) 0–85% of (meth)acrylonitrile.

Still another graft copolymer by weight comprises about (I) 5–60% of organopolysiloxanes with terminal OH functional groups, (II) 0–30% of organopolysiloxanes with trimethylsilyl end groups, (III) 5–60% of aliphatic or mixed aliphatic-aromatic polyester-urethanes or polyester-urethanes and polyesters or polycarbonates and optionally polyurethanes and polyethers, and (IV) 5–60% of polymerized units of vinyl monomers.

The invention also relates to a process for the preparation of graft copolymer dispersions, characterized in that mixtures of about (I) 8–90% by weight of organopolysiloxanes with terminal OH functional groups, (II) 4.99–85% by weight of aliphatic or mixed aliphatic-aromatic polyester-urethanes or polyester-urethanes and polyesters or polycarbonates and optionally polyether-urethanes and polyethers, (III) 5–85% by weight of one or more vinyl monomers and (IV) 0.001–2% by weight of one or more agents which form free radicals, are subjected to a polymerization reaction at temperatures of up to about 250° C.

The invention furthermore relates to a process for the preparation of graft copolymer dispersions, characterized in that mixture of about (I) 8–90% by weight of organopolysiloxanes with terminal OH functional groups, (II) 4.999–80% by weight of aliphatic or mixed aliphatic-aromatic polyesters or polycarbonates and optionally polyethers, (III) 0.1–10% by weight of mono-, di- or poly-isocyanates, (IV) 4.9–80% by weight of one or more vinyl monomers, and (V) 0.001–2% by weight of one or more agents which form free radicals, the sum of components I–V being 100% are subjected to a polymerization and urethanization reaction at temperatures of up to about 250° C.

The invention also relates to organopolysiloxane compositions which can be crosslinked at room temperature and which contain graft copolymer dispersions and also crosslinking agents, hardening catalysts and fillers and, if appropriate, further additives.

The invention furthermore relates to the use of organopolysiloxane compositions which can be crosslinked at room temperature and which contain the graft copolymer dispersions according to the invention, as one-component or two-component systems for sealing compositions.

The graft copolymer dispersions are prepared by a process in which mixtures of an organopolysiloxane with terminal OH functional groups, an aliphatic or mixed aliphatic-aromatic polyester, polycarbonate or polyester-urethane, and optionally a polyether or polyether-urethane, and one or more vinyl monomers and optionally mono-, di- or poly-isocyanates are brought to a reaction temperature at which the free radical polymerization and at the same time the urethanization proceed sufficiently rapidly. Mixtures of organopolysiloxanes with terminal OH functional groups and organopolysiloxanes containing no functional groups can also be introduced into the reaction mixture if desired. The polymerization can be carried out by a continuous or discontinuous process. In principle, the components to be reacted can be added in any desired sequence, but the best results are achieved if mixtures of the siloxane and polyester component and vinyl monomers are added simultaneously when carrying out the polymerization reaction.

The organopolysiloxanes with terminal OH functional groups are represented by the following formula:

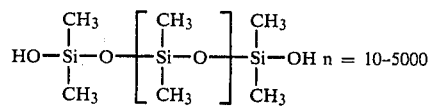

Up to 30 mol % of the methyl groups may be replaced by ethyl, vinyl and/or phenyl groups, but methyl-substituted organopolysiloxanes are preferably employed.

The aliphatic or mixed aliphatic-aromatic polyesters employed in the grafting copolymerization reaction are prepared in a manner known per se, by esterification or trans-esterification of mixtures of aliphatic or aromatic dicarboxylic acids, their anhydrides or esters and aliphatic dialcohols; compare Ullmanns Enzyklopädie der technischen Chemie (Ullmanns Encyclopaedia of Industrial Chemistry), Volume 14, Urban and Schwarzenberg, Munich, 1963, page 80 et seq.

Adipic acid, sebacic acid, terephthalic acid, phthalic acid, isophthalic acid, maleic acid, fumaric acid and itaconic acid are preferably employed as the dicarboxylic acids; the polyhydric alcohols preferably employed are ethylene glycol, propane-1,2-diol and -1,3-diol, butane-1,3-diol and -1,4-diol, hexane-1,6-diol, 2,2-dimethylpropane-1,3-diol and polyethylene glycols and polypropylene glycols, or polyhydric aliphatic alcohols which contain 2–7 ether atoms in the molecule; compare German Auslegeschrift 1,054,620.

Higher-functional carboxylic acids or alcohols are employed for branched polyesters, examples being glycerol, 1,1,1-trimethylolpropane, hexanetriol and pentaerythritol; compare also German patent specification No. 1,105,160 and German Auslegeschrift 1,029,147. The molecular weights of the polyesters are between about 800 and 10,000 and the OH numbers are between about 0.1 and 80. The residual water contents of the polyesters are in general less than 0.1%. If desired, it is also possible to employ particular polyesters which have, for example, a narrow molecular weight distribution and which are obtained by polymerization of lactones, such as, for example, β-propiolactone, γ-butyrolactone or ε-caprolactone, or have been synthesized by copolymerization of epoxides with cyclic anhydrides; compare K. Hamann, Makrom. Chem. 51 (1962) 53 and R. F. Fischer, J. Poly. Sci. 44 (1960) 155.

Suitable polyesters in the context of the invention are also polycarbonates or mixed ester-polycarbonates, which can be obtained by a trans-esterification reaction with, for example, diphenyl carbonate, examples which may be mentioned being butylene glycol-polycarbonate and hexane-1,6-diol-polycarbonate. Appropriate purely aliphatic polycarbonates are also obtainable by ring-opening polymerization of, for example, glycol carbonate or by copolymerization of epoxides and carbon dioxide.

The polyesters can be employed by themselves or as mixtures with other polyesters or optionally polyethers.

The polyethers which can be used according to the invention and contain at least one, as a rule two to eight and preferably two to three, hydroxyl groups in the molecule are also of a type which is known per se, and are prepared, for example, by self-polymerization of epoxides, such as ethylene oxide, propylene oxide, butylene oxide, tetrahydrofuran, styrene oxide or epichlorohydrin, for example in the presence of $BF_3$, or by addition of these epoxides, optionally as mixtures or successively, onto starting components with reactive hydrogen atoms, such as water, alcohols or amines, for example ethylene glycol, propylene 1,3-glycol or 1,2-glycol, trimethylolpropane, 4,4'-dihydroxydiphenylpropane, aniline, ammonia, ethanolamine and ethylenediamine. Sucrose polyethers such as are described, for example, in German Auslegeschriften 1,176,358 and 1,064,938 can also be used according to the invention. Polyethers which predominantly contain (up to 90% by weight, relative to all the OH groups present in the polyether) primary OH groups are in many cases preferred. Polyethers modified by vinyl polymers, such as modified polyethers which are formed, for example, by polymerization of styrene or acrylonitrile in the presence of polyethers (U.S. Pat. Nos. 3,383,351, 3,304,273, 3,523,093 and 3,110,695 and German Pat. No. 1,152,536), are also suitable, as are polybutadienes containing OH groups.

Polythioethers which may be mentioned are, in particular, the condensation products of thiodiglycol by itself and/or with other glycols, dicarboxylic acids, formaldehyde, aminocarboxylic acids or aminoalcohols. The products are mixed polythioethers, polythioether-esters or polythioether-ester-amides, depending on the co-components.

The aliphatic and mixed aliphatic-aromatic polyesters and polyethers employed are at least partly urethanized. Urethanization of the free OH functional groups in the polyester and polyether is carried out in a known manner by reaction with mono-, di- or polyisocyanate in the stoichiometric amount or in amount which is less than or greater than the stoichiometric amount. All the known aliphatic, aromatic and aliphatic-aromatic isocyanates are used in this reaction, and the isocyanates which are readily available industrially, such as, for example, cyclohexyl isocyanate, phenyl isocyanate, hexamethylene diisocyanate, phenylene diisocyanate, toluylene diisocyanate or 4,4'-diisocyanatodiphenylmethane, are preferably employed.

The urethanization can be carried out before, during or after the grafting polymerization. The urethanization takes place very rapidly at elevated temperatures, and if desired, unreacted isocyanate can be removed. The urethanization can also be carried out during the polymerization of the vinyl compounds without having an adverse effect on the further course of the reaction. Furthermore, it is of course also possible for the graft polymer dispersion formed to be reacted with the isocyanate only after the vinyl polymerization has ended.

Examples of vinyl monomers which may be mentioned are: olefins, such as ethylene, propylene, isobutylene, vinyl esters of aliphatic or aromatic carboxylic acids, preferably vinyl acetate and vinyl propionate, $\alpha,\beta$-unsaturated mono- or di-carboxylic acids and derivatives thereof, such as (meth)acrylic acid, methyl (meth)acrylate, ethyl(meth)acrylate, propyl or isopropyl (meth)acrylate, n-butyl, iso-butyl or tert.-butyl (meth)acrylate, 2-ethylhexyl(meth)acrylate, (meth)acrylamide, N-alkyl-substituted (meth)acrylamide derivatives, (meth)acrylonitrile, maleic anhydride, maleimide, N-alkyl-maleimides, maleic acid monoesters or diesters, vinyl-aromatic compounds, such as styrene, $\alpha$-methylstyrene and 4-chlorostyrene, vinyl chloride, vinylidene chloride, vinylidene fluoride, tetrafluoroethylene and vinyl ethers, such as ethyl vinyl ether or n-butyl vinyl ether; from the series of allyl compounds there may be mentioned allyl alcohol, allyl acetate, 1,3-diacetoxy-2-methylenepropane, 2-methylenepropane-1,3-diol, allyl ethyl carbonate and allyl phenyl carbonate. If cross-linking or increase in the molecular weight of the vinyl resin phase is desired, divinyl compounds or diallyl compounds can be employed. Examples of such compounds which may be mentioned are divinylbenzene, (meth)acrylates of polyhydric alcohols, such as, for example, ethylene glycol dimethacrylate and diethylene glycol diacrylate, and divinyl ether.

The free radical polymerization of the vinyl monomers can be initiated in a manner known per se with the aid of agents which form free radicals, ultraviolet radiation, $\alpha$-, $\beta$- or $\gamma$-radiation or by means of heat, without further additives. Polymerization initiated by radiation is preferably carried out in the presence of sensitizers; compare, for example, A. A. Jenkins, A. Ledwith, Reactivity, Mechanism and Structure in Polymer Chemistry, John Wiley and Sons, London, New York, 1974, page 465.

In order to initiate the free radical polymerization of the vinyl monomers, agents which form free radicals are employed in amounts of about 0.001 to 2, preferably 0.02 to 0.8, % by weight, relative to the total mixture of first polymer, second polymer and vinyl monomer. Examples which may be mentioned of agents which form free radicals are azo initiators, such as azo-bisisobutyric acid dinitrile (AIBN), azo esters, azo-imino esters or azo-N-alkylamides, peroxides, such as di-tert.-butyl peroxide, di-cumyl peroxide and di-benzoyl peroxide, peresters, such as amyl perpivalate, tert.-butyl perpivalate, tert.-butyl peroctoate, tert.-butyl perbenzoate and tert.-butyl perneodecanoate, percarbonates, such as cyclohexyl percarbonate or bisisopropyl percarbonate, or hydroperoxides, such as, for example, cumyl hydroperoxide or tert.-butyl hydroperoxide.

Further suitable initiators are benzopinacol, benzopinacol derivatives or other heat-labile highly substituted ethane derivatives.

The polymerization can furthermore be initiated with the aid of redox systems at temperatures lower than those at which the agents which form free radicals decompose purely thermally.

Examples of redox initiators which may be mentioned are combinations of peroxides and amines, such as, for example, benzoyl peroxide and triethylamine, trialkyl-boron compounds and oxygen, hydroperoxides and sulphinic acids, formaldehyde or aldoses or combinations with low-valent transition metal salts or peroxide/sulphur dioxide systems.

The polymerization can be carried out continuously or discontinuously, under normal pressure or under reaction pressures of up to, for example, 300 bar, preferably up to 15 bars, and at reaction temperatures of between $-20°$ C. and $+250°$ C., preferably at 70° to 190° C. If desired, the polymerization can also be carried out in the presence of solvents or diluents, solvents or diluents which may be mentioned being water, alcohols, such as methanol, ethanol or tert.-butanol, aliphatic or aromatic hydrocarbons, halogenated hydrocarbons, such as chlorobenzene or fluorinated compounds, ethers, such as dioxane or tetrahydrofuran, and esters, such as, for example, ethyl acetate. However, the polymerization is preferably carried out without a solvent.

If desired, the polymerization reaction can be carried out in the presence of molecular weight regulators. Regulators which may be mentioned are mercaptans, such as n- or tert.-dodecylmercaptan, thioglycol, thioglycerol or thioacetates, and furthermore sulphur-free molecular weight regulators, such as hydrocarbons, examples which may be mentioned being paraffin fractions, such as, for example, petroleum ether, light petrol or wash benzine, and α-olefins, such as, for example, propylene, isobutylene and but-1-ene, and furthermore ketones, such as, for example, acetone, methyl ethyl ketone or cyclohexanone, and also aldehydes, such as, for example, formaldehyde, acetaldehyde, propionaldehyde or isobutyraldehyde, or allyl compounds, such as, for example, allyl alcohol, allyl acetate, 1,3-diacetoxy-2-methylenepropane or allyl carbonates. Possible telogens are furthermore halogenated hydrocarbons, such as methylene chloride, tetrachloroethane, dibromoethane and the like. As is to be expected, the viscosities of the dispersions can be controlled with the aid of such regulators.

The reaction of the monomers employed is determined by the polymerization process chosen and the reaction conditions. In the case of the discontinuous polymerization procedure, conversions which are as high as possible are aimed for, so that at least 80% of the monomers employed, but preferably more than 90%, are reacted. The residual monomers are removed by known processes by distillation under normal pressure or under reduced pressure. The residual monomer contents still effectively found in the dispersions after working up are negligibly small; in general, they are less than 1,000 ppm, and preferably less than 100 ppm.

If desired, antioxidants, stabilizers, UV absorbers, anti-ageing agents, plasticizers and substances having a fungistatic or bacteriostatic action can be introduced into the batch when the polymerization reaction has ended.

The fillers customarily used in the preparation of silicone elastomers can also be employed. Examples of such fillers are silicic acids, which have been prepared by various processes and have various specific surface areas.

The silicone/polyester/vinyl polymer dispersions obtained according to the invention are particularly suitable for use in one-component and two-component compositions which harden at room temperature. As is known, such compositions, which harden in accordance with the condensation principle, consist of polydiorganosiloxanes with hydroxyl end groups, crosslinking agents, fillers and catalysts.

Some or all of the polydiorganosiloxanes with hydroxyl end groups can be replaced by the graft copolymer dispersions according to the invention. The crosslinking agents used are silanes which contain, in the molecule, at least 3 groups which can easily be split off hydrolytically, such as carboxylic acid groups, carboxamide groups, oxime groups, amine oxide groups and amine groups. A reinforcing filler is, for example, pyrogenically produced silicon dioxide, and a possible non-reinforcing filler is, for example, chalk. The catalysts used are, inter alia, organic tin compounds, such as dibutyl-tin dilaurate.

Compared with the silicone compositions known hitherto, silicone compositions in which the graft copolymer dispersions according to the invention are used can be coated considerably better with commercially available lacquers based, for example, on alkyd resin or polyurethane. The silicone compositions which have hardened at room temperature and which contain the graft copolymers according to the invention as building-up constituents can be lacquered in the same manner as wood. Furthermore, excellent adhesion, even under wet conditions, to wood, metals and concrete has also been found with these novel systems.

The following examples illustrate the preparation of the silicone/second polymer/vinyl monomer dispersions according to the invention. Unless otherwise indicated, data relating to amounts are to be understood as parts by weight or percentages by weight.

EXPERIMENTAL SECTION

The polysiloxanes with OH functional groups are prepared by the procedure known from the literature; compare W. Noll, Chemie und Technologie der Silicone (Chemistry and Technology of the Silicones), Verlag Chemie GmbH, Weinheim/Bergstr., 2nd edition, 1968, chapter 5, page 162 et seq.

The polydimethylsiloxanes with OH functional groups which are given in the examples are characterized as follows:

| OH—polysiloxane No. | Viscosity (mPas) at 20° C. |
|---|---|
| 1 | 5,000 |
| 2 | 10,000 |
| 3 | 18,000 |
| 4 | 50,000 |

The polyesters are prepared by melt condensation, the water of reaction formed being distilled off until the desired OH and acid numbers are reached; compare Houben-Weyl, Methoden der Organischen Chemie (Methods of Organic Chemistry), Volume XIV/2, Georg Thieme-Verlag, Stuttgart, 1963, page 1 et seq. The most important characteristic data of the polyesters used are summarized in Table 1.

TABLE 1

| Symbol of the polyester | Composition of the polyester | OH number | Acid number |
|---|---|---|---|
| A | adipic acid, diethylene glycol | 40 | <1 |
| B | adipic acid, ethylene glycol, butane-1,4-diol | 55 | <1 |
| C | hexanediol-polycarbonate | 58 | 0.1 |

Polyether A is a trifunctional mixed polyether of ethylene oxide and propylene oxide. The OH number is 49 and the viscosity at 20° C. is 520 (mPas).

EXAMPLE 1

The initial material is introduced into a 6 l stirred kettle and warmed to 110° C. under nitrogen. Solution 1 is then added in the course of 2 hours, solution 2 is subsequently added in the course of 5 minutes, and the mixture is then stirred at 110° C. for 2 hours. Volatile constituents are stripped off at 120° C. under a high vacuum.

| Initial material | Solution 1 | Solution 2 |
|---|---|---|

-continued

| Example No. | Polysiloxane 1 | Polyester A | Polysiloxane 1 | Vinyl acetate | tert.-Butyl perpivalate | Cyclohexyl isocyanate | tert.-Butyl perpivalate |
| --- | --- | --- | --- | --- | --- | --- | --- |
| 1 | 1,600 | 1,000* | 400 | 1,000 | 4.5 | 62 | 2.25 |

| Example No. | Viscosity mPas | Composition in % by weight | | | OH number |
| --- | --- | --- | --- | --- | --- |
| | | Polysiloxane | Polyester-urethane | Vinyl acetate | |
| 1 | 30,000 | 50.8 | 25.4 | 23.8 | 3.5 |

*Polyester dehydrated at 120° C. and under 0.1 mm Hg for 2 hours.

EXAMPLE 2-4

The initial material is warmed to 110° C. under nitrogen. The solution is added in the course of 1 hour and the mixture is then subsequently stirred at 110° C. for 1 hour. The volatile constituents are stripped off at 110°–120° C. in vacuo.

| Example No. | Polysiloxane 1 | Initial mixture | | | Hexamethylene diisocyanate | Cyclohexyl isocyanate | Solution | | |
| --- | --- | --- | --- | --- | --- | --- | --- | --- | --- |
| | | Polyester A | | Polyether A | | | Vinyl acetate | Polysiloxane 1 | tert.-Butyl perpivalate |
| | | | B | | | | | | |
| 2 | 1,600 | 800 | | 200 | 70 | 42 | 1,000 | 400 | 6.0 |
| 3 | 1,600 | | 800 | 200 | 70 | 42 | 1,000 | 400 | 6.0 |
| 4 | 1,600 | | 1,000 | | 70 | 42 | 1,000 | 400 | 6.0 |

| Example No. | Viscosity mPas | Composition | | | | OH number |
| --- | --- | --- | --- | --- | --- | --- |
| | | Polysiloxane | Polyester-urethane | Polyether-urethane | Polyvinyl acetate | |
| 2 | 72,000 | 50.1 | 22.3 | 5.6 | 22.0 | 0.5 |
| 3 | 64,000 | 50.1 | 22.3 | 5.6 | 22.0 | 3.5 |
| 4 | 82,000 | 50.9 | 27.2 | | 21.9 | 2.0 |

EXAMPLE 5

500 g of polyester C and 1,000 g of polysiloxane 1 are initially introduced into a 6 l stirred kettle. The mixture is warmed to 110° C. under nitrogen. A solution of 500 g of polyester C, 1,000 g of polysiloxane 1, 1,000 g of vinyl acetate and 3.0 g of tert.-butyl perpivalate is then added, while stirring. When the addition has ended, the batch is subsequently stirred for 1 hour. The volatile constituents are stripped off over a distillation bridge under 20 mm Hg and at a bottom temperature of 120° C. A dispersion which has a viscosity of 52,500 mPas and the following composition is obtained: 25.3% by weight of polycarbonate, 50.6% by weight of polysiloxane and 24.1% by weight of polymerized vinyl acetate units.

The compositions prepared by the process described here were mixed according to the following recipe with the aid of crosslinking agents and catalysts which promote crosslinking and were hardened under the influence of atmospheric moisture: 200 g of graft copolymer, 10.4 g of a titanium complex having the following approximate composition

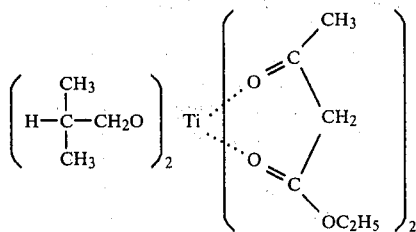

11.4 g of bis-(N-methylbenzamido)-ethoxymethylsilane and 2.2 g of dibutyl-tin diacetate.

The crosslinked products are elastic and free from tackiness. They were coated with an alkyd lacquer, and the adhesion of this lacquer to the silicone was determined after 7 days with the aid of the cross-hatch test. In this test, a 2.54 cm square on the lacquered surface is cut into 100 square pieces of equal size with a razor blade, so that a painted surface with a grid-like appearance is obtained. Adhesive tape (Tesafilm No. 101 from Messrs. Beiersdorf AG, Hamburg) is then pressed firmly onto this grid. The adhesive tape is subsequently removed by slowly being pulled off at an angle of about 30°. The percentage value for the retention of the lacquer is obtained from the number of painted, square pieces which remain on the hardened formulation after removal of the adhesive tape. The physical properties and the results of the cross-hatch test are found in the following table. For Comparison Examples 6 and 7, instead of the graft copolymers, siloxane 1 was used in Example 6 and polysiloxane 4 was used in Example 7.

| Example No. | Evenness of the lacquer | Adhesion of the lacquer (%) | E modulus (100% elongation (N/mm$^2$) | Tensile strength (N/mm$^2$) | Elongation at break (%) |
| --- | --- | --- | --- | --- | --- |
| 1 | good | 100 | 0.195 | 0.550 | 409 |
| 2 | good | 95 | 0.106 | 0.314 | 568 |
| 3 | good | 31 | 0.091 | 0.385 | 567 |
| 4 | good | 46 | 0.170 | 0.431 | 431 |
| 5 | good | 94 | 0.437 | 0.899 | 454 |
| 6 | poor | 0 | 0.141 | 0.299 | 295 |
| 7 | poor | 18 | 0.097 | 0.313 | 544 |

It will be understood that the specification and examples are illustrative but not limitative of the present invention and that other embodiments within the spirit and scope of the invention will suggest themselves to those skilled in the art.

We claim:

1. A graft copolymer comprising (I) as a first polymeric moiety an organopolysiloxane with OH functional groups, (II) as a second polymeric moiety a polyester-urethane, and (III) units of vinyl monomers, units of the first and second polymeric moieties being linked via vinyl polymer bridges, all these units having been polymerized in the presence of mixtures of the first and second polymeric moieties, the first polymeric moiety being present in about 10–90% by weight, the second polymeric moiety being present in about 5–85% by weight, and the polymerized units of vinyl compounds being present in about 5 to 85% by weight.

2. A graft copolymer according to claim 1, including a fourth ingredient present in up to about 40% by weight and comprising polymerized units of at least one of alkyl(meth)acrylates with 1–8 C atoms in the alkyl component, (meth)acrylamide, N-alkyl-substituted (meth) acrylamides, maleimides and (meth)acrylonitrile.

3. A graft copolymer according to claim 1, wherein the second polymeric moiety may in part comprise polyesters, polycarbonates, polyether-urethanes and/or polyethers.

4. A graft copolymer according to claim 1, wherein (III) comprises by weight about (a) 5–90% of styrene, (b) 10–95% of alkyl (meth)acrylates with 1–8 C atoms in the alkyl component and (c) 0–85% of (meth)acrylonitrile.

5. A graft copolymer according to claim 1, comprising by weight about (I) 5–60% of an organopolysiloxane with terminal OH functional groups, and 0–30% of an organopolysiloxane with trimethylsilyl end groups (II) 5–60% of an aliphatic or mixed aliphatic-aromatic polyester-urethane or polyester-urethane and polyester or polycarbonate and optionally polyether-urethane and polyether, and (III) 5–60% of polymerized units of vinyl monomers.

6. A process for the preparation of a graft copolymer according to claim 1, comprising subjecting to a polymerization reaction at a temperature up to about 250° C. a mixture by weight comprising about (I) 8–90% of organopolysiloxane with terminal OH functional groups, (II) 4.999–85% of an aliphatic or mixed aliphatic-aromatic polyester-urethane or polyester-urethane and polyester or polycarbonate and optionally polyether-urethane and polyether, (III) 5–85% of one or more vinyl monomers and (IV) 0.001–2% of an agent which forms free radicals.

7. A process according to claim 6, wherein the mixture contains 0.1 to 10% by weight of an isocyanate, polymerization simultaneously effecting urethanization.

8. In a room temperature curable composition comprising an organopolysiloxane, a silane having in its molecule at least 3 groups which can readily be split off hydrolytically as cross-linking agent, and a cross-linking catalyst, the improvement wherein the organopolysiloxane at least in part comprises a copolymer according to claim 1.

* * * * *